United States Patent
Lu et al.

(10) Patent No.: US 12,526,871 B2
(45) Date of Patent: Jan. 13, 2026

(54) SIDELINK BEARER MANAGING METHOD AND APPARATUS, TERMINAL, AND MEDIUM

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 405 days.

(21) Appl. No.: 17/857,498

(22) Filed: Jul. 5, 2022

(65) Prior Publication Data
US 2022/0338295 A1 Oct. 20, 2022

Related U.S. Application Data

(63) Continuation of application No. PCT/CN2020/071232, filed on Jan. 9, 2020.

(51) Int. Cl.
| | |
|---|---|
| H04W 72/04 | (2023.01) |
| H04W 76/14 | (2018.01) |
| H04W 76/23 | (2018.01) |
| H04W 76/30 | (2018.01) |
| H04W 92/18 | (2009.01) |

(52) U.S. Cl.
CPC .......... *H04W 76/23* (2018.02); *H04W 76/14* (2018.02); *H04W 76/30* (2018.02); *H04W 92/18* (2013.01)

(58) Field of Classification Search
CPC ..... H04W 76/23; H04W 76/14; H04W 76/30; H04W 76/22; H04W 76/27; H04W 92/18; H04W 4/40; H04W 24/08; H04W 28/065
See application file for complete search history.

(56) References Cited

U.S. PATENT DOCUMENTS

| | | | |
|---|---|---|---|
| 2020/0296619 A1* | 9/2020 | Pan | H04W 76/14 |
| 2020/0314959 A1* | 10/2020 | Agiwal | H04W 4/44 |
| 2020/0344636 A1* | 10/2020 | Lee | H04W 4/70 |

(Continued)

FOREIGN PATENT DOCUMENTS

| | | |
|---|---|---|
| CN | 106028471 A | 10/2016 |
| CN | 109618566 A | 4/2019 |

(Continued)

OTHER PUBLICATIONS

Notice of Allowance issued in corresponding Chinese application No. 202210816297.3, mailed Oct. 16, 2023.

(Continued)

*Primary Examiner* — Mahbubul Bar Chowdhury
(74) *Attorney, Agent, or Firm* — BAYES PLLC

(57) ABSTRACT

The present application relates to the field of wireless communications. Disclosed are a sidelink bearer managing method and apparatus, a terminal, and a medium. The method comprises: acquiring the bearer state of a sidelink bearer, the bearer state comprising a first bearer state and/or a second bearer state, the first bearer state being the bearer state in a first terminal, the second bearer state being the bearer state in a second terminal; and managing the sidelink bearer according to the bearer state.

7 Claims, 6 Drawing Sheets

---

301 Acquire a bearer status of a sidelink bearer

302B When the first terminal is in a dormant state or an inactive state, manage the sidelink bearer by itself according to the bearer status

(56) References Cited

U.S. PATENT DOCUMENTS

| | | | |
|---|---|---|---|
| 2020/0351699 A1* | 11/2020 | Pan | H04W 28/0268 |
| 2021/0105743 A1* | 4/2021 | Lin | H04W 72/02 |
| 2021/0153169 A1* | 5/2021 | Lin | H04L 5/006 |
| 2022/0015160 A1* | 1/2022 | Xu | H04W 76/14 |
| 2022/0217575 A1* | 7/2022 | Wang | H04W 28/0268 |
| 2022/0264678 A1* | 8/2022 | Jung | H04W 76/27 |
| 2022/0279389 A1* | 9/2022 | Xing | H04W 28/0226 |
| 2022/0286896 A1* | 9/2022 | Wang | H04W 28/0263 |
| 2022/0295337 A1* | 9/2022 | Kim | H04W 76/14 |

FOREIGN PATENT DOCUMENTS

| | | |
|---|---|---|
| CN | 110383885 A | 10/2019 |
| CN | 110661772 A | 1/2020 |
| EP | 3800953 A1 | 4/2021 |
| EP | 3952398 A1 | 2/2022 |
| EP | 4018751 A1 | 6/2022 |
| WO | 2015163626 A1 | 10/2015 |
| WO | 2019096393 A1 | 5/2019 |
| WO | 2019141371 A1 | 7/2019 |

OTHER PUBLICATIONS

First Office Action issued in corresponding Japanese application No. 2022-541902, mailed Sep. 12, 2023.
Lenovo, Motorola Mobility, "QoS management for NR V2X", R2-1901053, 3GPP TSG-RAN WG2 Meeting #105 Athens, Greece, Feb. 25-Mar. 1, 2019.
OPPO, "Discussion on PC5-RRC for unicast", R2-1903211, 3GPP TSG-RAN WG2 Meeting #105bis Xi'an, China, Apr. 8-Apr. 12, 2019.
Huawei, "Offline discussion on open issues of V2X 38.331 running CR", R2-1916447, 3GPP TSG-RAN WG2 #108 Reno, Nevada, Nov. 18-22, 2019.
ZTE, Sanechips, "Consideration on QoS management for NR V2X", R2-1816988, 3GPP TSG-RAN WG2 #104 Spokane, USA, Nov. 12-16, 2018.
Extended European Search Report issued in corresponding European application No. 20911911.4, mailed Nov. 7, 2022.
First Office Action issued in corresponding Indian application No. 202217038201, mailed Jan. 4, 2023.
Priority Review issued in corresponding Chinese application No. 202210816297.3, mailed Jun. 30, 2023.
Notice of Allowance issued in corresponding European application No. 20911911.4, mailed Jul. 10, 2023.
First Office Action issued in corresponding Chinese application No. 202210816297.3, mailed Jul. 25, 2023.
3GPP TSG-RAN WG3 #100; Tdoc R3-183215; Busan, Korea, May 21-23; Agenda Item: 23.3; Source: Ericsson; Title: Other Bearer Context procedures.
3GPP TSG-RAN WG2 Meeting #93bis; R2-162286; Dubrovnik, Croatia, Apr. 11-15, 2016; Agenda Item: 8.2.1 Source: Huawei, HiSilicon; Title: Support of QoS for PC5-based V2V transport.
Second Office Action issued in corresponding Japanese application No. 2022-541902, mailed Jan. 5, 2024.
Source: Ericsson, Convida Wireless, Intel; Title: Discussion on PC5 QoS model SA WG2 Meeting #132 S2-1904426 Apr. 8-12, 2019, Xi'An, China.
"Potential AS layer impacts on SL connection setup and configuration in unicast", R2-1816517, Source: Huawei, HiSilicon, 3GPP TSG-RAN WG2 # 104, Spokane, USA, Nov. 12-16, 2018, 4 pages.
"Support of QoS for PC5-based V2V transport", R2-163811, Source: Huawei, HiSilicon, 3GPP TSG-RAN WG2 Meeting #94, Nanjing, China, May 23-27, 2016, 6 pages.
International Search Report dated Oct. 13, 2020 from the International Searching Authority Re. Application No. PCT/CN2020/071232, 4 pages.
Written Opinion dated Oct. 13, 2020 from the International Searching Authority Re. Application No. PCT/CN2020/071232, 9 pages.
"New SID: Study on NR V2X", RP-181480, Source: Vodafone, 3GPP TSG RAN Meeting #80, La Jolla, USA, Jun. 11-14, 2018, 5 pages.
"Remaining issues on SLRB configuration", R2-1913712, Source: Huawei, HiSilicon, 3GPP TSG-RAN WG2 Meeting #107 bis, ChongQing, China Oct. 14-Oct. 18, 2019, 12 pages.
"Admission control for NR SL", R2-1912877, Source: InterDigital, Ericsson, MediaTek, CATT, ITL, Xiaomi, Fraunhofer, LG, 3GPP TSG-RAN WG2 #107bis, Chongqing, China, Oct. 14-18, 2019, 4 pages.
"Criteria to establish and release SL QoS flow and radio bearer", R2-1907363, Source: Ericsson, 3GPP TSG-RAN WG2 #106, Reno, USA, May 13-17, 2019, 4 pages.

* cited by examiner

SIDELINK BEARER MANAGING METHOD AND APPARATUS, TERMINAL, AND MEDIUM

CROSS-REFERENCE TO RELATED APPLICATION

This application is a continuation of International Application No. PCT/CN2020/071232, filed on Jan. 9, 2020, the content of which is incorporated herein by reference in its entirety.

TECHNICAL FIELD

The present application relates to the field of wireless communications, and in particular, to a method and apparatus for managing a sidelink bearer, a terminal, and a medium.

BACKGROUND

In order to realize a direct communication between user equipment and user equipment in a Vehicle to Everything (V2X) system, a SideLink (SL) transmission method is introduced.

In the related art, in the process of establishing and releasing a unicast link, a symmetric configuration mode is often used to perform communication configuration on a sidelink bearer. In this process, the user equipment configures the sidelink bearer for data to be sent (or a preconfigured parameter) through the base station.

However, the above method may cause a problem of communication failure due to differences in Radio Link Control (RLC) parameters selected in the sidelink bearers of two user equipments.

SUMMARY

Embodiments of the present application provide a method, apparatus, terminal, and medium for managing a sidelink bearer, which can be used to solve the problem of communication failure due to differences in RLC parameters selected in the bearers of two user equipments.

According to an aspect of the present application, a method for managing a sidelink bearer is provided, the method including:
acquiring a bearer status of the sidelink bearer, where the bearer status includes: a first bearer status and/or a second bearer status, the first bearer status is a bearer status in the first terminal, and the second bearer status is a bearer status in a second terminal; and
managing the sidelink bearer according to the bearer status.

According to an aspect of the present application, an apparatus for managing a sidelink bearer is provided, and the apparatus includes:
a receiving module, configured to acquire a bearer status of the sidelink bearer, where the bearer status includes: a first bearer status and/or a second bearer status, the first bearer status is a bearer status in the first terminal, and the second bearer status is a bearer status in a second terminal; and
a processing module, configured to manage the sidelink bearer according to the bearer status.

According to an aspect of the present application, a terminal is provided, the terminal including: a processor; a transceiver connected to the processor; a memory for storing executable instructions of the processor; where the processor is configured to load and execute the executable instructions to implement the method for managing a sidelink bearer as described in the above aspects.

According to an aspect of the present application, a computer-readable storage medium is provided, and executable instructions are stored in the readable storage medium, and the executable instructions are loaded and executed by a processor to implement the method for managing a sidelink bearer as described in the above aspects.

The technical solutions provided by the embodiments of the present application include at least the following beneficial effects.

By obtaining the bearer status of the sidelink bearer (such as the associated bearer status in another terminal being communicated), and managing the sidelink bearer according to the bearer status, the terminal can perform correct parameter configuration on the sidelink bearer on the basis of obtaining the bearer status of the another terminal, which improves the communication success rate of the sidelink bearer.

BRIEF DESCRIPTION OF DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

DETAILED DESCRIPTION

In order to make the objectives, technical solutions and advantages of the present application more clear, the embodiments of the present application will be further described in detail below with reference to the accompanying drawings.

First, the terms involved in the embodiments of the present application are briefly introduced:

Vehicle to everything (V2X): It is the key technology of the future intelligent transportation system, and it mainly studies the vehicle data transmission scheme based on the 3GPP communication protocol. The V2X communication includes Vehicle to Vehicle (V2V) communication, Vehicle to Infrastructure (V2I) communication, and Vehicle to People (V2P) communication. V2X applications may improve driving safety, reduce congestion and vehicle energy consumption, improve traffic efficiency, etc.

Figure 1:
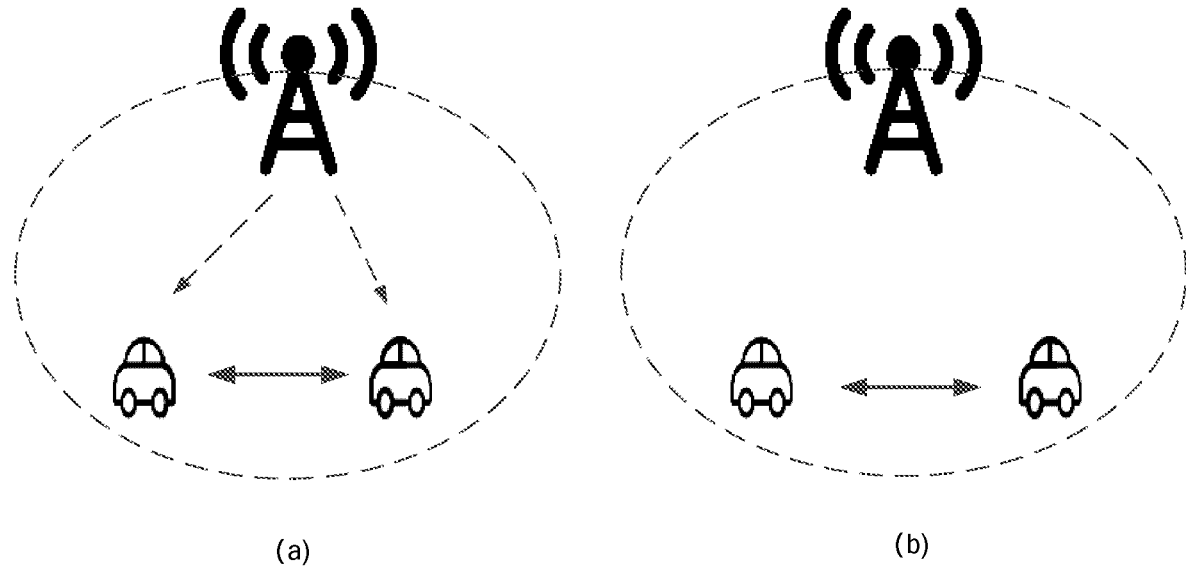
FIG. 1 shows a schematic diagram of a transmission mode of sidelink in the related art.

SideLink (SL) transmission: It is a device-to-device communication method with high spectral efficiency and low transmission delay. Two transmission modes of the sidelink are defined in 3GPP: mode A and mode B. As shown in (a) of FIG. 1, in mode A, the transmission resource of the terminal is allocated by the base station through the downlink, and the terminal sends data on the sidelink according to the resource allocated by the base station; and the base station may allocate the resource for a single transmission to the terminal, or may allocate the resource for semi-static transmission to the terminal. As shown in (b) of FIG. 1, in mode B, the terminal selects one resource from a resource pool to transmit data by itself. Specifically, the terminal may select the transmission resource from the resource pool by means of listening, or select the transmission resource from the resource pool by means of random selection.

Figure 2:
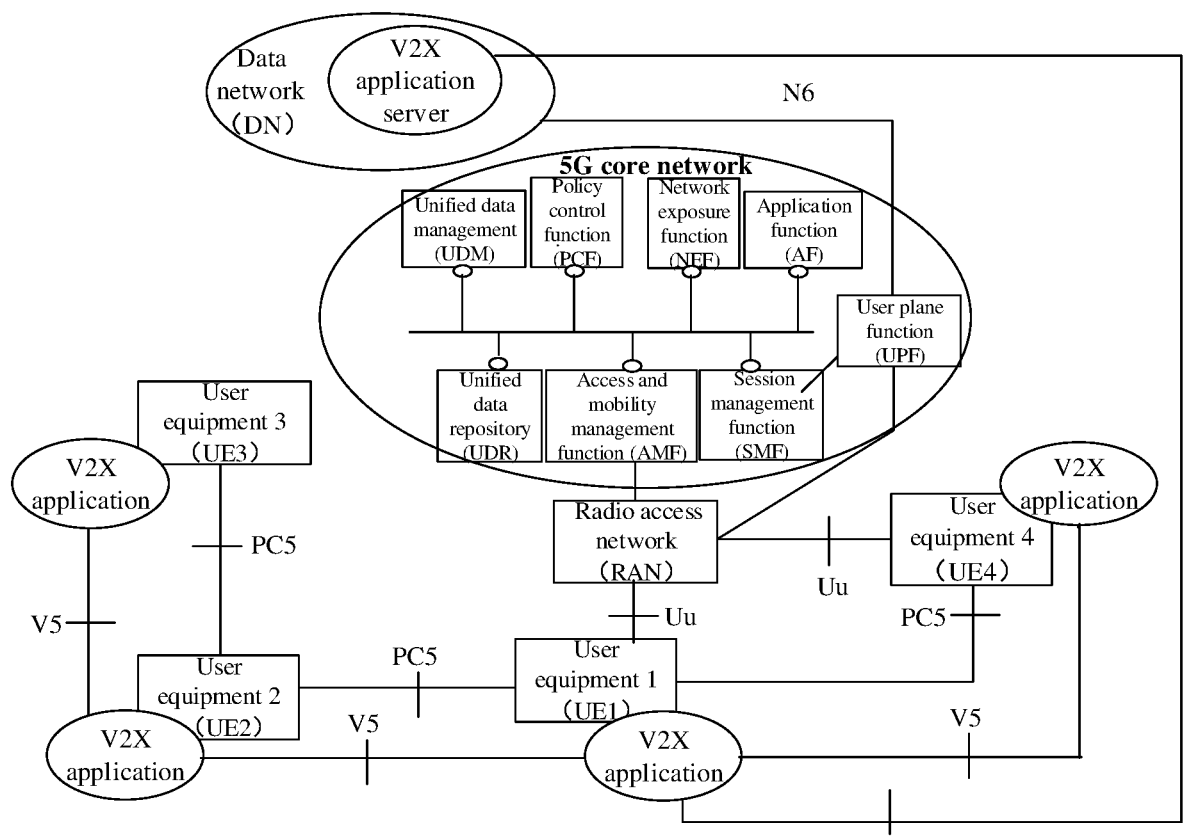
FIG. 2 shows a block diagram of a communication system supporting sidelink transmission provided by an exemplary embodiment of the present application.

FIG. 2 shows a block diagram of a communication system supporting sidelink transmission provided by an exemplary embodiment of the present application. The communication system may be a schematic diagram of a Non-roaming 5G system architecture, and the system architecture may be applied to a Vehicle to everything (V2X) service using D2D technology.

The system architecture includes a Data Network (DN), and a V2X Application Server required for the V2X service is set in the DN. The system architecture also includes a 5G core network. The network functions of the 5G core network include: Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF).

The system architecture further includes: a New Generation-Radio Access Network (NG-RAN) and four exemplary user equipments (i.e., user equipment 1 to user equipment 4). Each user equipment is provided with the V2X Application. One or more access network devices, such as a base station (gNB), are set in the radio access network. The user equipment performs uplink transmission to the access network device.

In the system architecture, the data network and the user plane function in the 5G core network are connected through an N6 Reference Point, and the V2X application server and the V2X application in the user equipment are connected through a V1 reference point; the radio access network is connected to the AMF function and the UPF function in the 5G core network, and the radio access network is connected to user equipment 1 and user equipment 5 through the Uu reference point respectively; multiple user equipments use the PC5 reference point for sidelink transmission, and multiple V2X applications are connected through the V5 reference point. The above reference points may also be referred to as "interfaces".

Figure 3:
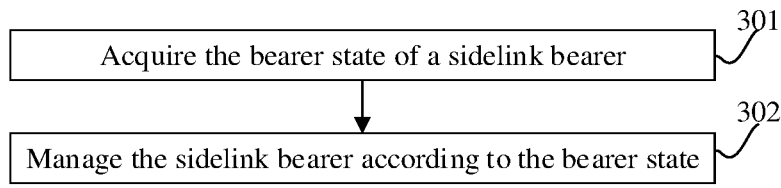
FIG. 3 shows a flowchart of a method for managing a sidelink bearer provided by an exemplary embodiment of the present application.

FIG. 3 shows a flowchart of a method for managing a sidelink bearer provided by an exemplary embodiment of the present application. The method is applied to a first terminal as an example for description. The method includes the following steps.

In step 301, a bearer status of a sidelink bearer is acquired.

Optionally, the first terminal and the second terminal described in this embodiment are user equipments in the embodiment shown in FIG. 2. Optionally, the first terminal and the second terminal are communicatively connected through a sidelink.

Optionally, in the process of managing (establishing, modifying, and releasing) the sidelink bearer between the first terminal and the second terminal, the bearer status of the sidelink bearer needs to be determined. Optionally, the bearer status includes a first bearer status and a second bearer status. Optionally, the first terminal may acquire at least one of the first bearer status and the second bearer status as the bearer status of the sidelink bearer. That is:

the first terminal acquires the first bearer status as the bearer status of the sidelink bearer;

or, the first terminal acquires the second bearer status as the bearer status of the sidelink bearer;

or, the first terminal acquires the first bearer status and the second bearer status as the bearer status of the sidelink bearer.

The bearer status includes: a first bearer status and/or a second bearer status, the first bearer status is a bearer status in the first terminal, and the second bearer status is a bearer status in the second terminal. The second terminal is a terminal communicated with the first terminal. For example, both the first terminal and the second terminal are vehicles in the V2X system.

The first bearer status includes at least one of a related state of a carried first Quality of Service (QoS) flow, a first QoS parameter, a first RLC mode, and a Robust Header Compression (ROHC) configuration. The related state of the first QoS flow includes at least one of whether the first QoS flow exists in the first terminal, whether a priority of the first QoS flow is higher than a first priority threshold, and whether a delay of the first QoS flow is less than a first delay threshold.

The second bearer status includes at least one of a related state of a carried second QoS flow, a second QoS parameter, a second RLC mode, and the ROHC configuration. The related state of the second QoS flow includes at least one of whether the second QoS flow exists in the second terminal, whether a priority of the second QoS flow is higher than a second priority threshold, and whether a delay of the second QoS flow is less than a second delay threshold.

Optionally, the first QoS flow and the second QoS flow are associated QoS flows. That is, the first QoS flow and the second QoS flow are associated with the same bearer identifier, or, the first QoS flow and the second QoS flow are associated with the same logical channel identifier, or, the first QoS flow and the second QoS flow are associated with the same bearer identifier and logical channel identifier.

Optionally, acquiring the second bearer status by the first terminal includes: acquiring from a PC5 connection established between the second terminal and the first terminal. In an example, the first terminal receives PC5-Radio Resource Control (RRC) signaling from the second terminal, and acquires the second bearer status according to the PC5-RRC signaling from the second terminal.

In step 302, the sidelink bearer is managed according to the bearer status.

The managing the sidelink bearer according to the bearer status in this step includes at least one of establishing the sidelink bearer according to the bearer status, releasing the sidelink bearer according to the bearer status, modifying the sidelink bearer according to the bearer status.

When the bearer status satisfies a corresponding condition, the sidelink bearer is managed accordingly. That is, when the bearer status satisfies a first condition corresponding to establishing a bearer, the sidelink bearer is created; when the bearer status satisfies a second condition corresponding to releasing the bearer, the sidelink bearer is released; when the bearer status satisfies a third condition corresponding to modifying the bearer, the sidelink bearer is modified.

Optionally, there is a network device corresponding to the first terminal. When there is a communication connection between the first terminal and the network device, it means that the first terminal is in a connected state; when there is no communication connection between the first terminal and the network device, it means that the first terminal is in a dormant state or an inactive state.

Optionally, there is a network device corresponding to the second terminal. When there is a communication connection between the second terminal and the network device, it means that the second terminal is in a connected state; when there is no communication connection between the second terminal and the network device, it means that the second terminal is in a dormant state or an inactive state.

According to whether there is a connection between the first terminal and the network device, that is, whether the first terminal is in a connected state, the sidelink bearer is managed in different manners according to the bearer status. The different manners refer to:

when the first terminal is in the connected state, sending bearer information to the network device according to whether the bearer status satisfies one of the first condition, the second condition, and the third condition, so as to trigger the network device to deliver a management instruction of the sidelink bearer;

when the first terminal is in the dormant state or the inactive state, managing the sidelink bearer by itself according to whether the bearer status satisfies one of the first condition, the second condition and the third condition.

Figure 4:
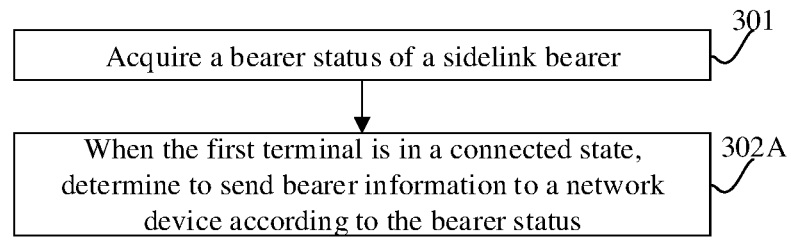
FIG. 4 shows a flowchart of a method for managing a sidelink bearer provided by another exemplary embodiment of the present application.
Figure 5:
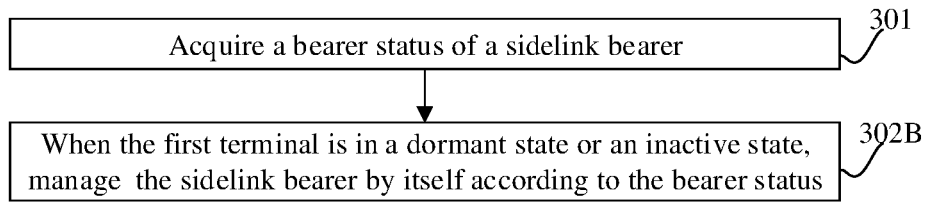
FIG. 5 shows a flowchart of a method for managing a sidelink bearer provided by another embodiment of the present application.

Hereinafter, FIGS. 4 and 5 show two different management manners, respectively. FIG. 4 is a management manner when the first terminal is in the connected state, and FIG. 5 is a management manner when the first terminal is in the dormant state or the inactive state.

In an optional embodiment based on FIG. 3, FIG. 4 shows a flowchart of a method for managing a sidelink bearer provided by another exemplary embodiment of the present application. In this embodiment, step 302 may be replaced by step 302A, and the method is applied to the first terminal as an example for description. The method includes the following steps.

In step 302A, when the first terminal is in the connected state, it is determined to send bearer information to the network device according to the bearer status.

Optionally, when the first terminal is in the connected state, the first terminal sends bearer information to the network device according to the bearer status, and the bearer information is used to trigger the network device to send management signaling of the sidelink bearer to the first terminal. The bearer information is all or part of information in the bearer status, for example, the bearer information is all or part of information in the second bearer status. In one example, the network device may be an access network device.

When the bearer status satisfies the first condition, the bearer information is the first bearer information; when the bearer status satisfies the second condition, the bearer information is the second bearer information; when the bearer status satisfies the third condition, the bearer information is the third bearer information.

In an optional embodiment based on FIG. 3, FIG. 5 shows a flowchart of a method for managing a sidelink bearer provided by another embodiment of the present application. In this embodiment, step 302 may be replaced by step 302B, and the method is applied to the first terminal as an example for description. The method includes the following steps.

In step 302B, when the first terminal is in a dormant state or an inactive state, the sidelink bearer is managed by itself according to the bearer status.

When the first terminal is in a dormant state or an inactive state, in the case that the bearer status satisfies the first condition, a sidelink bearer is established.

When the first terminal is in a dormant state or an inactive state, in the case that the bearer status satisfies the second condition, the sidelink bearer is released.

When the first terminal is in a dormant state or an inactive state, in the case that the bearer status satisfies the third condition, the sidelink bearer is modified.

To sum up, the method provided in this embodiment obtains the bearer status of the sidelink bearer (for example, associated bearer status in another terminal being communicated), and manages the sidelink bearer according to the bearer status, so that one terminal can perform correct parameter configuration on the sidelink bearer on the basis of acquiring the bearer status of the another terminal, which improves the communication success rate of the sidelink bearer.

In this application, the methods for managing the sidelink bearer by the terminal when the bearer status meets the first condition corresponding to the establishment of bearer, when the bearer status meets the second condition corresponding to the release of bearer, and when the bearer status meets the third condition corresponding to the modification of bearer, are described separately.

Figure 6:
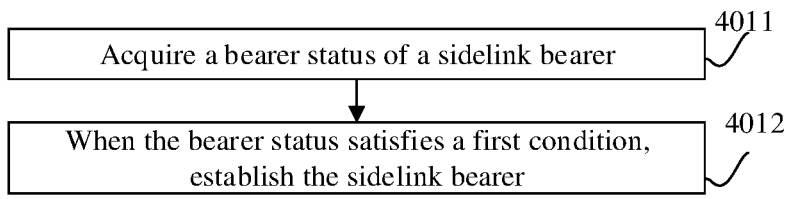
FIG. 6 shows a schematic flowchart of a method for managing a sidelink bearer when a bearer status satisfies a first condition provided by an exemplary embodiment of the present application.
Figure 7:
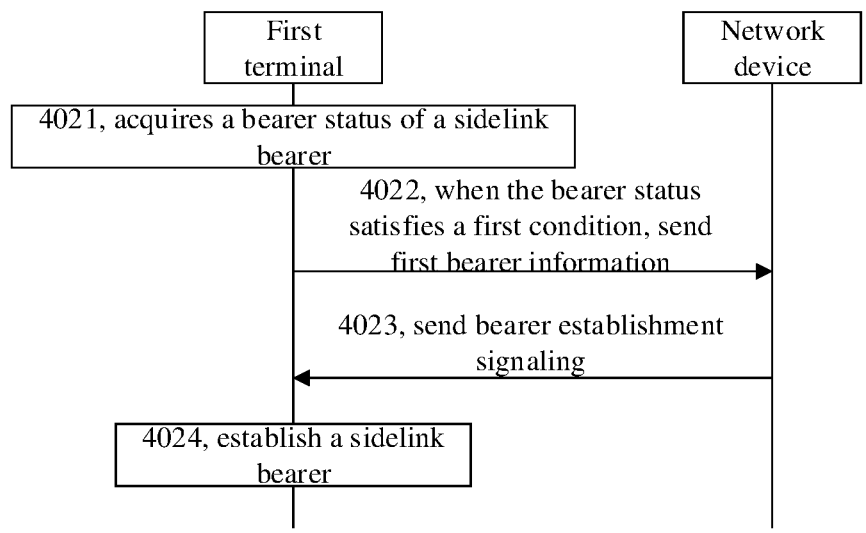
FIG. 7 shows a schematic flowchart of a method for managing a sidelink bearer when the bearer status satisfies the first condition provided by an exemplary embodiment of the present application.
Figure 8:
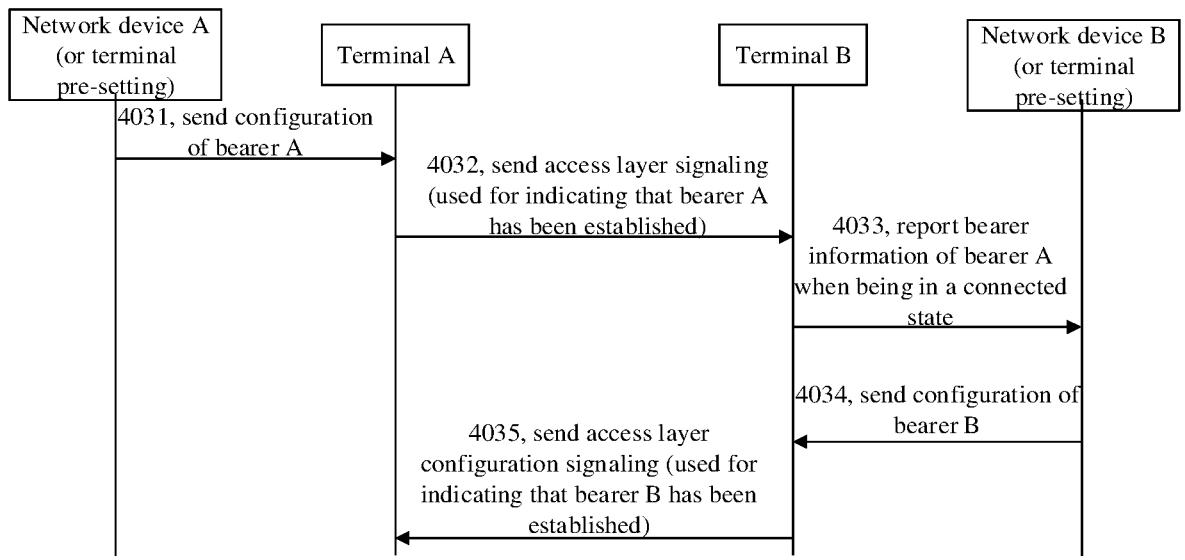
FIG. 8 shows a schematic flowchart of a method for managing a sidelink bearer when the bearer status satisfies the first condition provided by an exemplary embodiment of the present application.

FIGS. 6 to 8 are embodiments when the bearer status satisfies the first condition.

FIG. 6 shows a schematic flowchart of a method for managing a sidelink bearer provided by an exemplary embodiment of the present application. The method is applied to a first terminal in a dormant or inactive state as an example for illustration. The method includes the following steps.

In step 4011, a bearer status of the sidelink bearer is acquired.

The first terminal needs to acquire at least one of a first bearer status and a second bearer status.

When the first bearer status needs to be acquired, the first terminal reads its own first bearer status.

When the second bearer status needs to be acquired, the first terminal receives a PC5 RRC signaling sent by the second terminal, and acquires the second bearer status of the second terminal from the PC5 RRC signaling.

In step 4012, when the bearer status satisfies the first condition, a sidelink bearer is established.

The first condition is a condition for triggering the establishment of a sidelink bearer. Optionally, the condition for triggering the establishment of a sidelink bearer include at least one of the following conditions: the first terminal has not yet established a sidelink bearer; whether the second terminal carries a second QoS flow; the second QoS parameter satisfies a first preset condition; a second RLC mode in the second bearer status is RLC AM; the second RLC mode in the second bearer status is RLC UM; ROHC has been configured.

In the typical embodiment shown below, when at least one of the following conditions is met, the first terminal may determine that the bearer status satisfies the first condition, that is, the condition for triggering the establishment of a sidelink bearer is met:
1. when the second bearer status indicates that the second RLC mode is an RLC Acknowledged Mode (AM), and the first terminal has not yet established a sidelink bearer;
2. when the second RLC mode in the second bearer status is an RLC Unacknowledged Mode (UM), ROHC has been configured, and the first terminal has not yet established a sidelink bearer.

Since the first terminal is in a dormant state or an inactive state, when the first terminal determines that the bearer status satisfies the first condition, the first terminal selects target configuration information that conforms to the second RLC mode from candidate configuration information, and establishes a sidelink bearer according to the target configuration information to adapt to the bearer in the second terminal.

Optionally, the candidate configuration information is acquired by the first terminal from a System Information Block (SIB) or pre-configured information.

To sum up, in the method provided in this embodiment, the bearer status of the sidelink bearer (for example, the associated bearer status in another terminal being communicated) is acquired, and candidate configuration information is selected according to the bearer status, and then the sidelink bearer is managed according to the selection of the candidate configuration information, so that one terminal can, on the basis of obtaining the bearer status of the another terminal, perform correct parameter configuration corresponding to the establishment of the sidelink bearer when it is in the inactive state or dormant state, so as to complete the establishment of the sidelink bearer, which improves the communication success rate in the case of sidelink bearer creation.

FIG. 7 shows a schematic flowchart of a method for managing a sidelink bearer provided by an exemplary embodiment of the present application. Taking the method applied to a first terminal in a connected state as an example, the method includes the following steps.

In step 4021, the first terminal acquires a bearer status of the sidelink bearer.

The first terminal needs to acquire at least one of the first bearer status and the second bearer status.

When the first bearer status needs to be acquired, the first terminal reads its own first bearer status.

When the second bearer status needs to be acquired, the first terminal receives the PC5 RRC signaling sent by the second terminal, and acquires the second bearer status of the second terminal from the PC5 RRC signaling.

In step 4022, when the bearer status satisfies the first condition, the first terminal sends the first bearer information to the network device.

When the first terminal is in the connected state, it means that an RRC connection is established between the first terminal and the network device, and the first terminal and the network device may communicate through the RRC connection. In one example, the network device is an access network device.

When the bearer status satisfies the first condition described in step 4012, the first terminal sends first bearer information to the network device. Optionally, the first bearer information is used to trigger the network device to send management signaling for establishing a sidelink bearer to the first terminal. The first bearer information is all or part of the information in the bearer status.

Exemplarily, the first bearer information includes at least: a second RLC mode and a second QoS parameter.

In step 4023, the network device sends bearer establishment signaling to the terminal.

After receiving the first bearer information sent from the first terminal, the network device may trigger a response according to the first bearer information.

The network device sends bearer establishment signaling to the first terminal, where the bearer establishment signaling carries a bearer configuration conforming to the second RLC mode (and conforming to the second QoS parameter).

In step 4024, the terminal establishes a sidelink bearer.

Optionally, after receiving the bearer establishment signaling, the first terminal establishes a sidelink bearer according to the bearer configuration in the bearer establishment signaling.

To sum up, in the method provided in this embodiment, the bearer status of the sidelink bearer (for example, the associated bearer status in another terminal being communicated) is acquired, corresponding bearer information is configured according to the bearer status, the bearer information is sent to the network device, and then the sidelink bearer is managed according to a bearer signaling responded by the network device, so that one terminal can, on the basis of obtaining the bearer status of the another terminal, perform correct parameter configuration corresponding to establishing the sidelink bearer when it is in the connected state, which improves the communication success rate in the case of sidelink bearer creation.

FIG. 8 shows a schematic flowchart of a method for managing a sidelink bearer provided by an exemplary embodiment of the present application. Taking the method applied to terminal A and terminal B as an example, the method includes the following steps.

In step 4031, network device A sends a configuration of bearer A to terminal A.

When terminal A is in the connected state, network device A sends the configuration of bearer A to terminal A. Terminal A establishes bearer A according to the configuration of bearer A.

When terminal A is in an inactive state or a dormant state, when terminal A determines by itself that the bearer status satisfies the first condition, it selects the configuration of bear A through the candidate configuration provided in the terminal A pre-setting (system information block or pre-configured information), and establishes bearer A.

In step 4032, terminal A sends access layer signaling to terminal B, where the access layer signaling carries the second bearer status of bearer A.

Terminal A sends the second bearer status of bearer A to terminal B in the form of access stratum signaling. In an example, terminal A sends the second bearer status of bearer A to terminal B through PC5-RRC signaling.

In step 4033, when the terminal B is in the connected state, the terminal B reports the bearer information of bearer A to network device B.

Terminal B receives the second bearer status of bearer A sent by terminal A. When the second bearer status of bearer A satisfies the first condition and terminal B is in the connected state, terminal B reports the bearer information of bearer A to network device B.

After terminal B reports the bearer information of bearer A to network device B, network device B may receive the bearer status of bearer A, including at least one of the related state of QoS flow A carried by bearer A, QoS parameter A, RLC mode A, ROHC configuration situation. The related state of QoS flow A includes at least one of whether there is QoS flow A in terminal A, whether the priority of QoS flow A is higher than priority threshold A, and whether the delay of QoS flow A is less than delay threshold A.

In step 4034, network device B sends the configuration of bearer B to terminal B.

Optionally, network device B sends the configuration of bearer B to terminal B according to the bearer information of bearer A. After receiving the configuration of bearer B, terminal B establishes bearer B.

In step 4035, Terminal B sends access layer configuration signaling to terminal A.

Optionally, terminal B sends a message that bearer B has been established to terminal A in the form of access layer signaling, as a feedback message that bearer B has been established. In an example, terminal B sends the message that bearer B has been established to terminal A through PC5-RRC signaling.

In another embodiment, when terminal B is in a dormant state or inactive state, that is, when there is no RRC connection between terminal B and network device B, terminal B selects the configuration that conforms to RLC mode A from the candidate configuration in the terminal pre-setting (system information block or pre-configured information), and establishes bearer B.

To sum up, in the method provided in this embodiment, terminal B acquires the bearer status of bearer A, selects candidate configuration information according to the bearer status and its own network connection status, and then establishes the sidelink bearer according to the selection of the candidate configuration information, so that terminal B can correctly configure the parameter corresponding to the situation of establishing a sidelink bearer on the basis of obtaining the bearer status of terminal A, so as to complete the establishment of the sidelink bearer, which improves the communication success rate in the case of establishing the sidelink bearer.

FIGS. 9 to 12 are embodiments when the bearer status satisfies the second condition.

Figure 9:
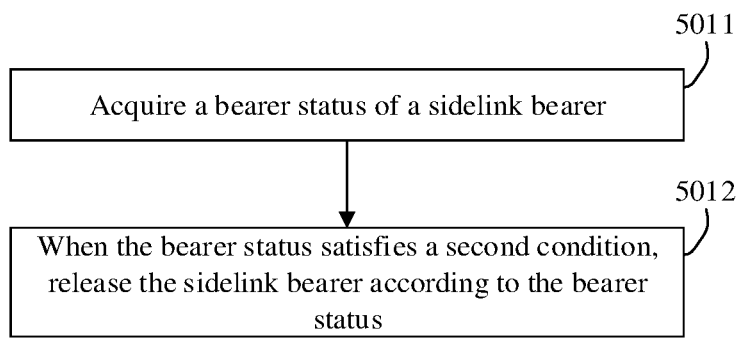
FIG. 9 shows a schematic flowchart of a method for managing a sidelink bearer when the bearer status satisfies a second condition provided by an exemplary embodiment of the present application.

FIG. 9 shows a schematic flowchart of a method for managing a sidelink bearer provided by an exemplary embodiment of the present application. The method is applied to a first terminal in a dormant state or an inactive state as an example for illustration. The method includes the following steps.

In step 5011, a bearer status of the sidelink bearer is acquired.

The first terminal needs to acquire at least one of the first bearer status and the second bearer status.

When the first bearer status needs to be acquired, the first terminal reads its own first bearer status.

When the second bearer status needs to be acquired, the first terminal receives the PC5 RRC signaling sent by the second terminal, and acquires the second bearer status of the second terminal from the PC5 RRC signaling.

In step 5012, when the bearer status satisfies the second condition, the sidelink bearer is released according to the bearer status.

The second condition is a condition for triggering the release of the sidelink bearer. Optionally, the condition for triggering the release of the sidelink bearer includes at least one of the following: the first bearer status indicates that the first QoS flow in the first terminal has been released or canceled; the sidelink bearer does not carry the first QoS flow; the second QoS parameter satisfies a second preset condition; the second RLC mode in the second bearer status is RLC AM; the second RLC mode in the second bearer status is RLC UM; the second bearer status indicates that the second terminal does not carry the second QoS flow; the second bearer status indicates that the second terminal carries the second QoS flow; the sidelink bearer needs to carry the feedback information of the second QoS flow; the first terminal receives the bearer release instruction sent by the network device; whether ROHC is configured.

In the typical embodiment shown below, when at least one of the following conditions is met, the first terminal determines that the bearer status meets the second condition, that is, the condition for triggering the release of the sidelink bearer is met:

1. the first bearer status indicates that the first QoS flow in the first terminal has been released or canceled, and the second bearer status indicates that the second terminal does not bear the second QoS flow;
the first QoS flow and the second QoS flow are associated QoS flows.
2. when the second RLC mode in the second bearer status is RLC AM, and the sidelink bearer does not bear the first QoS flow.

Optionally, when the first terminal determines that the bearer status meets the second condition, the first terminal automatically releases the sidelink bearer.

To sum up, the method provided in this embodiment acquires the bearer status of the sidelink bearer (for example, the associated bearer status in another terminal being communicated), and performs release management on the sidelink bearer according to the bearer status, so that the terminal can complete the release of the sidelink bearer when it is in an inactive state or a dormant state on the basis of acquiring the bearer status of the another terminal, thereby improving the communication success rate in the case of releasing the sidelink bearer.

Figure 10:
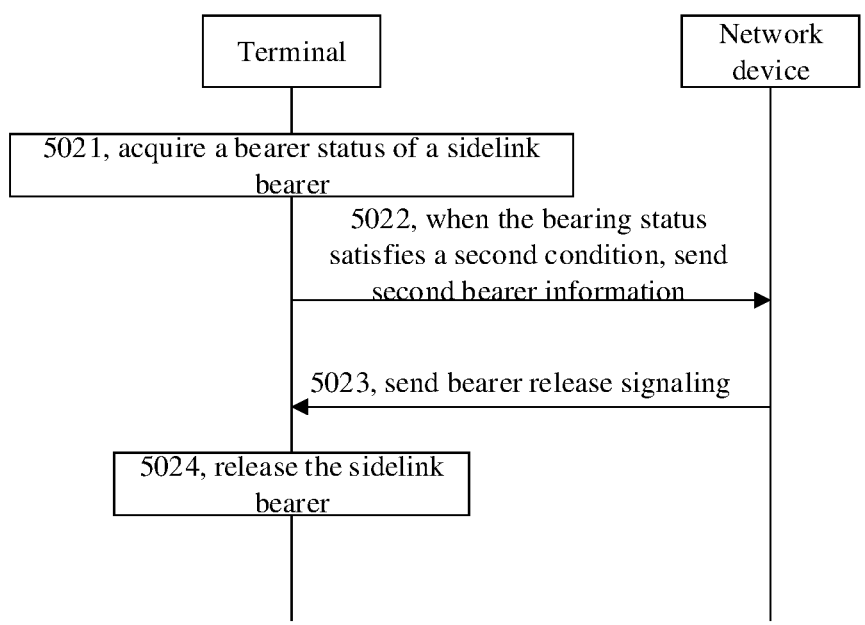
FIG. 10 shows a schematic flowchart of a method for managing a sidelink bearer when the bearer status satisfies the second condition provided by an exemplary embodiment of the present application.

FIG. 10 shows a schematic flowchart of a method for managing a sidelink bearer provided by an exemplary embodiment of the present application. Taking the method applied to a first terminal in a connected state and a network device connected thereto as an example, the method includes the following steps.

In step 5021, the terminal acquires a bearer status of a sidelink bearer.

The first terminal needs to acquire at least one of the first bearer status and the second bearer status.

When the first bearer status needs to be acquired, the first terminal reads its own first bearer status.

When the second bearer status needs to be acquired, the first terminal receives the PC5 RRC signaling sent by the second terminal, and acquires the second bearer status of the second terminal from the PC5 RRC signaling.

In step 5022, when the bearer status satisfies the second condition, the terminal sends second bearer information to the network device.

In this embodiment, when at least one of the following conditions is satisfied, the first terminal determines that the bearer status satisfies the second condition:

1. the first bearer status indicates that the first QoS flow in the first terminal has been released or canceled, and the second bearer status indicates that the second terminal does not bear the second QoS flow; the first QoS flow and the second QoS flow are associated QoS flows.
2. when the second RLC mode in the second bearer status is RLC AM, and the sidelink bearer does not bear the first QoS flow;
3. the first terminal receives the bearer release instruction sent by the network device, the second bearer status indicates that the second terminal carries the second QoS flow, and the sidelink bearer needs to carry the feedback information of the second QoS flow.

When the bearer status satisfies the second condition, the first terminal sends second bearer information to the network device. Optionally, the second bearer information is used to trigger the network device to send a signaling for releasing the sidelink bearer to the first terminal.

The second bearer information includes at least one of the following: a second RLC mode, a second QoS parameter, a bearer ID/index, and a logical channel ID.

In step 5023, the network device sends bearer release signaling to the terminal.

Optionally, after receiving the second bearer information sent from the first terminal, the network device may trigger a response according to the second bearer information. The network device sends a bearer release signaling to the first terminal. Optionally, the bearer release signaling carries the bearer configuration that needs to be modified.

In step 5024, the terminal releases the sidelink bearer.

After receiving the bearer release signaling, the first terminal releases the sidelink bearer according to the bearer release signaling.

To sum up, in the method provided in this embodiment, the bearer status of the sidelink bearer (for example, the associated bearer status in another terminal being communicated) is acquired, and corresponding bearer information is configured according to the bearer status, and the bearer information is sent to the network device, and then release management is performed on the sidelink bearer according to the bearer signaling responded by the network device, so that one terminal can complete the release of the sidelink bearer when it is in the inactive state or dormant state on the basis of obtaining the bearer status of the another terminal, thereby improving the communication success rate in the case of releasing the sidelink bearer.

For the first two conditions in the second condition, the following embodiments are also provided.

Figure 11:
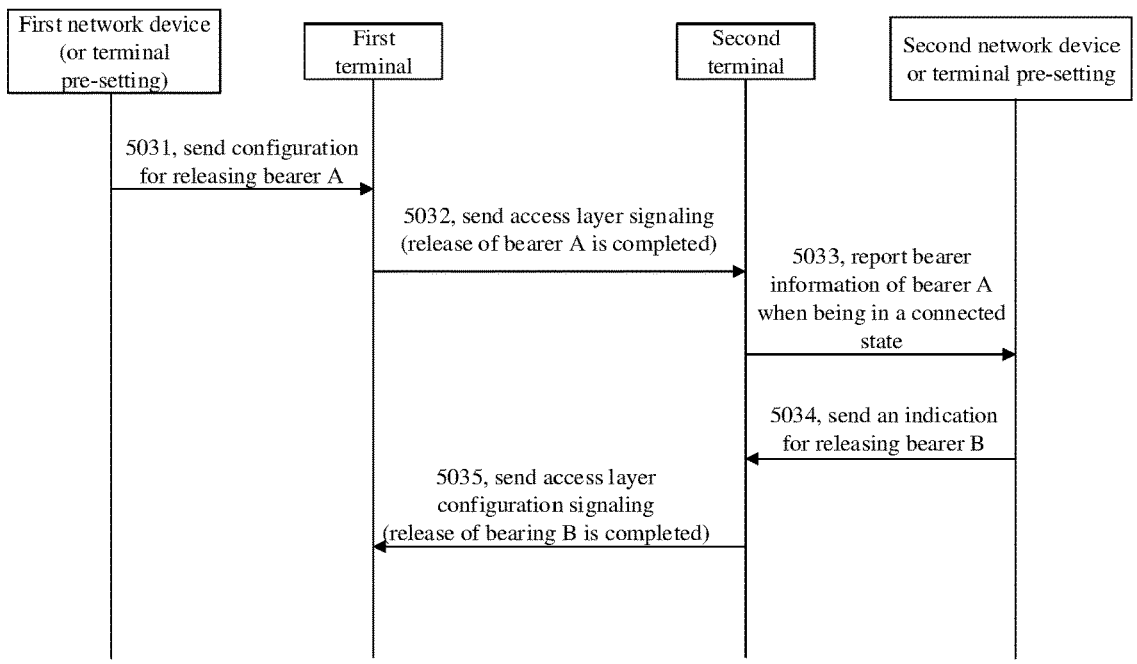
FIG. 11 shows a schematic flowchart of a method for managing a sidelink bearer when the bearer status satisfies the second condition provided by an exemplary embodiment of the present application.

FIG. 11 shows a schematic flowchart of a method for managing a sidelink bearer provided by an exemplary embodiment of the present application. Taking the method applied to terminal A and terminal B as an example, the method includes the following steps.

In step 5031, network device A sends an indication for releasing bearer A to terminal A.

When terminal A is in the connected state, network device A sends an indication for releasing bearer A to terminal A, and terminal A releases bearer A according to the indication.

When terminal A is in an inactive state or a dormant state, that is, when there is no connection between terminal A and network device A, and when the bearer status meets the second condition, terminal A releases bearer A by itself through the configuration of the terminal A pre-setting (system information block or pre-configured information).

In step 5032, terminal A sends access layer signaling to terminal B, where the access layer signaling is used to indicate that the release of bearer A is completed.

Terminal A sends a message that bearer A has been released to terminal B in the form of access layer signaling. In an example, terminal A sends the message that bearer A has been released to terminal B through PC5-RRC signaling.

In step 5033, when terminal B is in the connected state, terminal B reports the bearer information of bearer A to network device B.

When terminal B receives the message that bearer A has been released sent by terminal A, and terminal B is in a connected state, that is, when terminal B establishes a communication connection with network device B, terminal B reports the bearer information of bearer A to network device B.

After terminal B reports the bearer information of bearer A to network device B, network device B may receive the bearer status of bearer A. The bearer status of bearer A includes at least one of the related state of QoS flow A carried by bearer A, QoS parameter A, bearer ID, logical channel ID, RLC mode A, and ROHC configuration. The related state of QoS flow A includes at least one of whether there is QoS flow A in terminal A, whether the priority of QoS flow A is higher than priority threshold A, and whether the delay of QoS flow A is less than delay threshold A.

In step 5034, network device B sends an indication for releasing bearer B to terminal B.

Network device B sends an indication of bearer B to terminal B according to the bearer information of bearer A. Terminal B releases bearer B according to the indication.

In step 5035, Terminal B sends access layer configuration signaling to terminal A.

Terminal B sends a message that bearer B has been released to terminal A in the form of access indication signaling, as a feedback message that bearer B has been released. In an example, terminal B sends the message that bearer B has been released to terminal A through PC5-RRC signaling.

In another embodiment, when terminal B is in a dormant state or an inactive state, that is, when there is no communication connection between terminal B and network device B, when terminal B determines through a preset configuration of the terminal that the bearer status satisfies the second condition, terminal B may release bearer B by itself.

To sum up, in the method provided in this embodiment, terminal B acquires the bearer status of bearer A, selects candidate configuration information according to the bearer status and its own network connection status, and then releases the sidelink bearer according to the selection of the candidate configuration information, so that terminal B can complete the release of the sidelink bearer on the basis of acquiring the bearer status of the terminal A, thereby improving the communication success rate in the case of releasing the sidelink bearer.

For the third condition in the second condition, the following embodiments are also provided.

Figure 12:
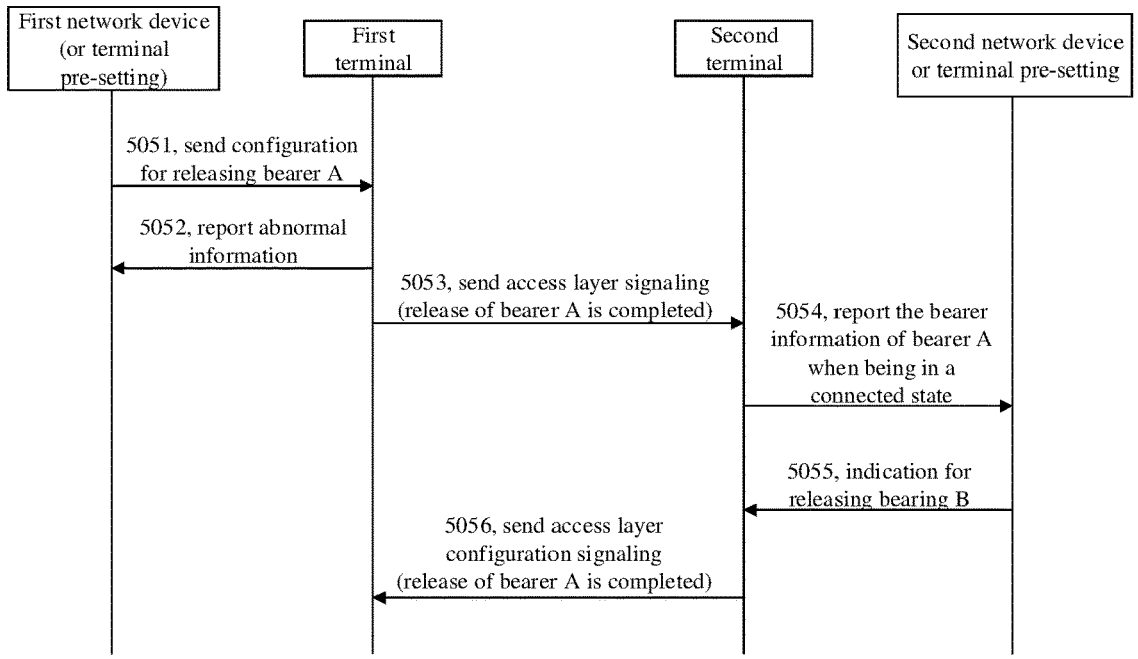
FIG. 12 shows a schematic flowchart of a method for managing a sidelink bearer when the bearer status satisfies the second condition provided by another exemplary embodiment of the present application.

FIG. 12 shows a schematic flowchart of a method for managing a sidelink bearer provided by another exemplary embodiment of the present application. The method is applied to terminal A and terminal B as an example for description. The method includes the following steps.

In step 5051, network device A sends an indication for releasing bearer A.

Network device A sends an indication for releasing bearer A to terminal A, and terminal A releases bearer A according to the indication. The indication for releasing bearer A may be a bearer release indication.

In step 5052, terminal A reports bearer information (also called abnormal information in this embodiment) of bearer A to network device A.

When terminal A acquires the bearer status of bearer B of terminal B and releases bearer A, if it is determined that the bearer status satisfies the following second condition:

the second condition: the first terminal receives the bearer release instruction sent by the network device, the second bearer status indicates that the second terminal carries the second QoS flow, and the sidelink bearer needs to carry the feedback information of the second QoS flow, then terminal A reports the bearer information of bearer A to network device A. The bearer information of bearer A may be sent to network device A through any one of RRC reset success signaling, failure information signaling, sidelink message signaling, and RRC reestablishment request signaling.

Optionally, the bearer information of bearer A includes at least one of the RLC mode B, the QoS parameter B, the bearer identifier of the bearer B, and the channel identifier B. The bearer information of bearer A is carried by at least one of the following signaling: RRC reconfiguration complete message (rrcreconfigurationcomplete), failure message (failureinformation), sidelink terminal message (sidelinkueinformation), and RRC restoration request (rrcreestablishmentrequest).

Network device A sends a bearer release indication or a bearer modification indication to terminal A according to the bearer information of bearer A. In this embodiment, taking the network device continuing to send the bearer release indication to the terminal A as an example, terminal A releases bearer A according to the indication.

In step 5053, terminal A sends access layer signaling to terminal B, and the access layer signaling is used to indicate that the release of bearer A is completed.

Terminal A sends a message that bearer A has been released to terminal B in the form of access layer signaling. In an example, terminal A sends the message that bearer A has been released to terminal B through PC5-RRC signaling.

In step 5054, terminal B reports the bearer information of bearer A to network device B.

When terminal B receives the message that bearer A has been released sent by terminal A, and terminal B is in a connected state, that is, when terminal B establishes a communication connection with network device B, terminal B reports bearer information of bearer A to network device B.

Optionally, the bearer information of bearer A includes at least one of the RLC mode B, the QoS parameter B, the bearer identifier of bearer B, and the channel identifier B.

In step 5055, network device B sends an indication for releasing bearer B to terminal B.

Network device B sends an indication for releasing bearer B to terminal B according to the bearer information of bearer A. Terminal B releases bearer B according to the indication.

In step 5056, terminal B sends access layer configuration signaling to terminal A.

Terminal B sends a message that bearer B has been released to terminal A in the form of access layer signaling, as a feedback message that bearer B has been released. In an example, terminal B sends the message that bearer B has been released to terminal A through PC5-RRC signaling.

It should be noted that steps 5053 to 5056 are optional steps.

To sum up, in the method provided in this embodiment, terminal B acquires the bearer status of bearer A, selects candidate configuration information according to the bearer status and its own network connection status, and then releases the sidelink bearer according to the selection of the candidate configuration information, so that terminal B can complete the release of the sidelink bearer on the basis of acquiring the bearer status of the terminal A, thereby improving the communication success rate in the case of releasing the sidelink bearer.

By reporting the abnormal information to network device A by terminal A, the communication success rate in the case where the sidelink bearer is released is further improved.

Figure 13:
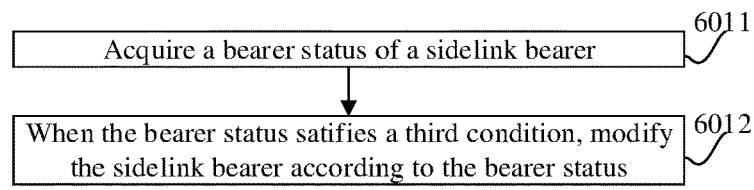
FIG. 13 shows a schematic flowchart of a method for managing a sidelink bearer when the bearer status satisfies a third condition provided by an exemplary embodiment of the present application.
Figure 14:
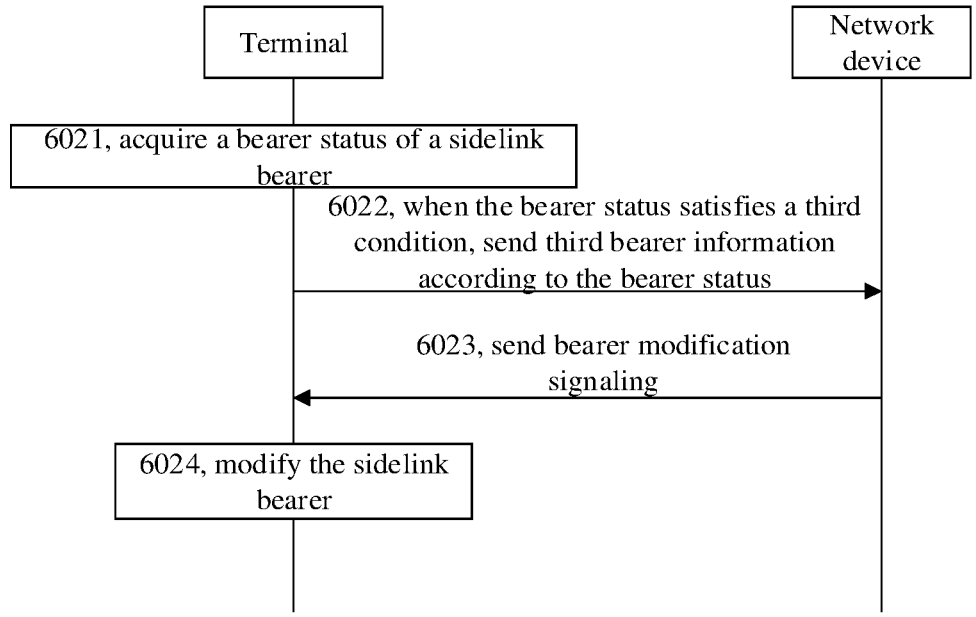
FIG. 14 shows a schematic flowchart of a method for managing a sidelink bearer when the bearer status satisfies the third condition provided by an exemplary embodiment of the present application.
Figure 15:
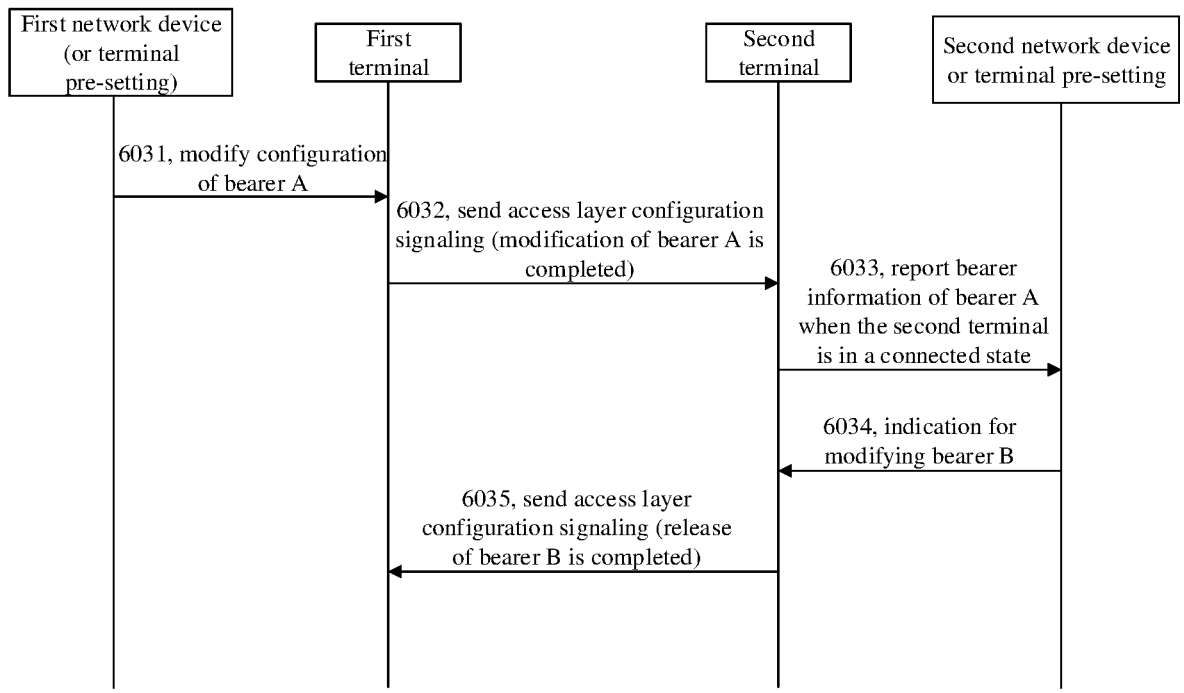
FIG. 15 shows a schematic flowchart of a method for managing a sidelink bearer when the bearer status satisfies the third condition provided by an exemplary embodiment of the present application.

FIGS. 13 to 15 are examples when the bearer status satisfies the third condition.

FIG. 13 shows a schematic flowchart of a method for managing a sidelink bearer provided by an exemplary embodiment of the present application. The method is applied to a first terminal in a dormant state or an inactive state as an example for description. The method includes the following steps.

In step 6011, a bearer status of a sidelink bearer is acquired.

The first terminal needs to acquire at least one of a first bearer status and a second bearer status.

When the first bearer status needs to be acquired, the first terminal reads its own first bearer status.

When the second bearer status needs to be acquired, the first terminal receives a PC5 RRC signaling sent by a second terminal, and acquires the second bearer status of the second terminal from the PC5 RRC signaling.

In step 6012, when the bearer status satisfies the third condition, the sidelink bearer is modified according to the bearer status.

The third condition is a condition for triggering modification of the sidelink bearer. Optionally, the condition for triggering modification of the sidelink includes at least one of the following conditions: the sidelink bearer in the first terminal is a bearer of reverse direction of the second terminal; the sidelink bearer does not carry the associated first QoS flow; the first QoS flow has been established/released/modified; the second QoS parameter satisfies the third preset condition; the second RLC mode in the second bearer status is RLC AM; the second RLC mode is RLC UM; ROHC is configured.

In the typical embodiment shown below, when at least one of the following conditions is met, the first terminal determines that the bearer status satisfies the third condition, that is, the condition for triggering modification of the sidelink bearer is met:

1. the second RLC mode in the second bearer status is RLC AM, the sidelink bearer in the first terminal is a bearer of reverse direction of the second terminal, and the sidelink bearer does not carry the associated first QoS flow;
2. the second RLC mode in the second bearer status is RLC UM, ROHC is configured, the sidelink bearer in the first terminal is the bearer of reverse direction of the second terminal, and the sidelink bearer does not carry the associated first QoS flow.

Optionally, when the first terminal determines that the bearer status satisfies the third condition, the first terminal modifies the bearer configuration of the sidelink bearer.

To sum up, in the method provided in this embodiment, the bearer status of the sidelink bearer (for example, the associated bearer status in another terminal being communicated) is acquired, and candidate configuration information is selected according to the bearer status, and then the sidelink bearer is managed according to the selection of the candidate configuration information, so that one terminal can, on the basis of obtaining the bearer status of the another terminal, perform correct parameter configuration corresponding to the modification of the sidelink bearer to complete the modification of the sidelink bearer when the terminal is in the inactive state or dormant state, which improves the communication success rate in the case of modification of the sidelink bearer.

FIG. 14 shows a schematic flowchart of a method for managing a sidelink bearer provided by an exemplary embodiment of the present application. Taking the method applied to a first terminal in a connected state as an example, the method includes the following steps.

In step 6021, the terminal acquires a bearer status of the sidelink bearer.

The first terminal needs to acquire at least one of the first bearer status and the second bearer status.

When the first bearer status needs to be acquired, the first terminal reads its own first bearer status.

When the second bearer status needs to be acquired, the first terminal receives the PC5 RRC signaling sent by the second terminal, and acquires the second bearer status of the second terminal from the PC5 RRC signaling. The second bearer status may be a changed second bearer status, such as a second bearer status after the second QoS flow is newly created, released, or modified.

In step 6022, when the bearer status satisfies the third condition, the terminal sends third bearer information to the network device according to the bearer status.

When the bearer status satisfies the third condition described in step 6012, the first terminal sends third bearer information to the network device. Optionally, the third bearer information is used to trigger the network device to send management signaling for modifying the sidelink bearer to the first terminal. Optionally, the third bearer information includes all or part of the information in the bearer status.

Optionally, the third bearer information includes: at least one of the state of the second QoS flow carried by the second terminal, the second QoS parameter, bearer ID, logical channel ID, second RLC mode, and ROHC configuration.

In step 6023, the network device sends bearer modification signaling to the terminal.

Optionally, after receiving the third bearer information sent from the first terminal, the network device may trigger a response according to the third bearer information, that is, sending a bearer modification signaling to the first terminal.

In step 6024, the terminal modifies the sidelink connection.

Optionally, after receiving the bearer modification signaling, the first terminal modifies the sidelink bearer according to the bearer modification signaling.

To sum up, in the method provided in this embodiment, the bearer status of the sidelink bearer (such as the associated bearer status in another terminal being communicated) is acquired, the corresponding bearer information is configured according to the bearer status, and the bearer information is sent to the network device, and then the sidelink bearer is modified and managed according to the bearer signaling responded by the network device, so that one terminal can perform correct parameter configuration corresponding to the case of modifying the sidelink bearer when it is in the connected state on the basis of obtaining the bearer status of the another terminal, which improves the communication success rate in the case of sidelink bearer modification.

FIG. 15 shows a schematic flowchart of a method for managing a sidelink bearer provided by an exemplary embodiment of the present application. The method is applied to terminal A and terminal B as an example for description. The method includes the following steps.

In step 6031, network device A sends an indication for modifying bearer A to terminal A.

When terminal A is in the connected state, network device A sends an indication for modifying bearer A to terminal A, where the indication is used to modify the configuration of bearer A, and terminal A modifies the configuration of bearer A according to the indication.

When terminal A is in an inactive state or a dormant state, that is, when there is no connection between terminal A and network device A, when terminal A determines that the bearer configuration needs to be modified through the candidate configuration of terminal A pre-setting (system information block or pre-configured information), the configuration of bearer A is modified.

In step 6032, terminal A sends access layer configuration signaling to terminal B, where the access layer configuration signaling is used to indicate that bearer A has been modified.

Terminal A sends the message that bearer A has been modified to terminal B in the form of access layer signaling.

In one example, terminal A sends the message that bearer A has been modified to terminal B through PC5-RRC signaling.

In step 6033, terminal B reports bearer information of bearer A to network device B.

When terminal B receives the message that bearer A has been modified sent by terminal A, and terminal B is in the connected state, that is, when terminal B establishes a communication connection with network device B, terminal B reports the modified bearer information of bearer A to network device B. The modified bearer information of bearer A at least includes: RLC mode and QoS parameter.

After terminal B reports the modified bearer information of bearer A to network device B, network device B may receive the bearer status of bearer A. The modified bearer status of bearer A includes at least one of the related state of QoS flow A carried by bearer A, QoS parameter A, bearer ID, logical channel ID, RLC mode A, and ROHC configuration. The related state of QoS flow A includes at least one of whether there is QoS flow A in terminal A, whether the priority of QoS flow A is higher than priority threshold A, and whether the delay of QoS flow A is less than delay threshold A. For example, the modified bearer information of bearer A includes: RLC mode, bearer ID, logical channel ID, and QoS parameter.

In step 6034, network device B sends an indication for modifying bearer B to terminal B.

Network device B sends an indication for modifying bearer B to terminal B according to the modified bearer information of bearer A. Terminal B modifies bearer B according to the indication.

In step 6035, terminal B sends access layer configuration signaling to terminal A.

Terminal B sends the message that bearer B has been modified to terminal A in the form of access layer signaling, as a feedback message for that bearer B has been modified. In an example, terminal B sends the message that bearer B has established to terminal A through PC5-RRC signaling.

In another embodiment, when terminal B is in a dormant state or an inactive state, that is, when there is no communication connection between terminal B and network device B, terminal B may modify bearer B through the configuration of terminal B pre-setting (system information block or pre-configured information).

To sum up, in the method provided in this embodiment, terminal B acquires the bearer status of bearer A, selects candidate configuration information according to the bearer status and its own network connection status, and then modify the sidelink bearer according to the selection of the candidate configuration information, so that terminal B can perform correct parameter configuration corresponding to the case of the modification of the sidelink bearer on the basis of obtaining the bearer status of terminal A, so as to complete the modification of the sidelink bearer, which improves the communication success rate in case of sidelink bearer modification.

Figure 16:
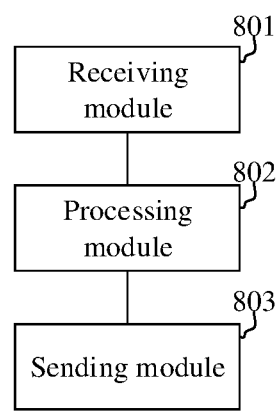
FIG. 16 shows a structural block diagram of an apparatus for managing a sidelink bearer provided by an exemplary embodiment of the present application.

FIG. 16 shows a structural block diagram of an apparatus for managing a sidelink bearer provided by an exemplary embodiment of the present application. The apparatus includes:
 a receiving module 801, configured to obtain a bearer status of the sidelink bearer, where the bearer status includes: a first bearer status and/or a second bearer status, the first bearer status is a bearer status in a first terminal, and the second bearer status is a bearer status in the second terminal; and
 a processing module 802, configured to manage the sidelink bearer according to the bearer status.

In an optional embodiment, the first bearer status includes: at least one of a related state of the first QoS flow carried by the first terminal, a first QoS parameter, a first RLC mode, and an ROHC configuration situation.

In an optional embodiment, the second bearer status includes: at least one of a related state of the second QoS flow carried by the second terminal, a second QoS parameter, a second RLC mode, and an ROHC configuration situation.

In an optional embodiment, the first bearer status includes a related state of a first QoS flow borne by the first terminal, the second bearer status includes a related state of a second QoS flow borne by the second terminal, the first QoS flow and the second QoS flow has the same bearer identifier and/or logical channel identifier.

In an optional embodiment, the apparatus further includes:
 a sending module 803, configured to, when the first terminal is in a connected state, determine to send bearer information to the network device according to the bearer status, where the bearer information is used to trigger the network device to send a management signaling of the sidelink bearer to the first terminal.

In an optional embodiment, the processing module 802 is configured to self-manage the sidelink bearer according to the bearer status when the first terminal is in a dormant state or an inactive state.

In an optional embodiment, the sending module 803 is configured to send first bearer information to the network device when the first terminal is in a connected state and the bearer status satisfies a first condition.

In an optional embodiment, the processing module 802 is configured to establish a sidelink bearer when the first terminal is in a dormant state or an inactive state and the bearer status satisfies the first condition.

In an optional embodiment, the first condition is a condition for triggering establishment of a sidelink bearer.

In an optional embodiment, the condition for triggering the establishment of a sidelink bearer includes at least one of the following:
 the first terminal has not yet established a sidelink bearer;
 whether the second terminal carries the second QoS flow;
 a second QoS parameter satisfies a first preset condition;
 a second RLC mode in the second bearer status is RLC AM;
 the second RLC mode in the second bearer status is RLC UM;
 ROHC is configured.

In an optional embodiment, the first condition includes the second RLC mode.

The processing module 802 is configured to select target configuration information corresponding to the second RLC mode from candidate configuration information, and establish a sidelink bearer according to the target configuration information. The candidate configuration information is obtained from the system information block or pre-configured information.

In an optional embodiment, the sending module 803 is configured to send second bearer information to the network device according to the bearer status when the first terminal is in the connected state and the bearer status satisfies the second condition.

In an optional embodiment, the processing module 802 is configured to release the sidelink bearer according to the bearer status when the first terminal is in a dormant state or an inactive state and the bearer status satisfies the second condition.

In an optional embodiment, the second condition is a condition for triggering the release of the sidelink bearer.

In an optional embodiment, the condition for triggering the release of the sidelink bearer includes at least one of the following:

the first bearer status indicates that the first QoS flow in the first terminal has been released or cancelled;

the sidelink bearer does not carry the first QoS flow;

the second QoS parameter satisfies a second preset condition;

the second RLC mode in the second bearer status is RLC AM;

the second RLC mode in the second bearer status is RLC UM;

the second bearer status indicates that the second QoS flow is not carried in the second terminal;

the second bearer status indicates that the second terminal carries the second QoS flow;

the sidelink bearer needs to carry feedback information of the second QoS flow;

the first terminal receives the bearer release instruction sent by the network device;

whether ROHC is configured.

In an optional embodiment, the sending module 803 is configured to send third bearer information to the network device according to the bearer status when the first terminal is in the connected state and the bearer status satisfies the third condition.

In an optional embodiment, the processing module 802 is configured to modify the sidelink bearer according to the bearer status when the first terminal is in a dormant state or an inactive state and the bearer status satisfies the third condition.

In an optional embodiment, the third condition is a condition for triggering modification of the sidelink bearer.

In an optional embodiment, the condition for triggering modification of the sidelink bearer includes at least one of the following:

the sidelink bearer in the first terminal is a bearer of reverse direction of the second terminal;

the sidelink bearer does not carry the associated first QoS flow;

the first QoS flow has been newly created/released/modified;

the second QoS parameter satisfies a third preset condition;

the second RLC mode in the second bearer status is RLC AM;

the second RLC mode in the second bearer status is RLC UM;

ROHC is configured.

In an optional embodiment, the bearer status includes a second bearer status.

The receiving module 801 is configured to acquire the second bearer status through a PC5 connection established between the first terminal and the second terminal.

In an optional embodiment, the processing module 802 is configured to perform at least one of the following steps:

establishing the sidelink bearer according to the bearer status;

releasing the sidelink bearer according to the bearer status;

modifying the sidelink bearer according to the bearer status.

It should be noted that the apparatus for managing a sidelink bearer provided in the above-mentioned embodiments is only illustrated by the division of the above-mentioned functional modules. In practical application, the above functions may be allocated to be completed by different functional modules according to needs, that is, the internal structure of the device may be divided into different functional modules to complete all or part of the functions described above.

Figure 17:
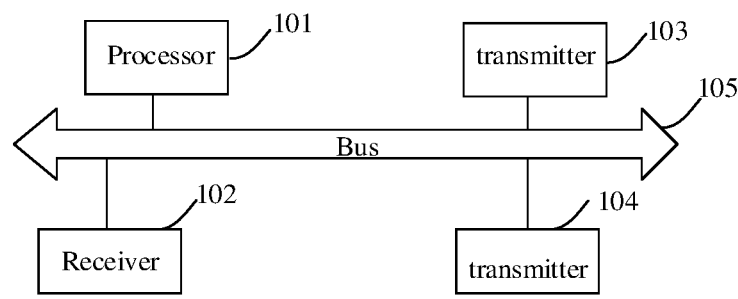
FIG. 17 shows a schematic structural diagram of a terminal provided by an exemplary embodiment of the present application.

FIG. 17 shows a schematic structural diagram of a communication terminal provided by an exemplary embodiment of the present application. The communication device includes: a processor 101, a receiver 102, a transmitter 103, a memory 104 and a bus 105.

The processor 101 includes one or more processing cores, and the processor 101 executes various functional applications and information processing by running software programs and modules. The receiver 102 and the transmitter 103 may be implemented as one communication component, which may be one communication chip. The memory 104 is connected to the processor 101 through the bus 105. The memory 104 may be configured to store at least one instruction, and the processor 101 is configured to execute the at least one instruction, so as to implement various steps in the foregoing method embodiments. Additionally, the memory 104 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Random Access Memory (SRAM), Read Only Memory (ROM), Magnetic Memory, Flash Memory, Programmable Read Only Memory (PROM).

In an exemplary embodiment, a computer-readable storage medium is also provided. The computer-readable storage medium stores at least one instruction, at least one piece of program, code set or instruction set, the at least one instruction, the at least one piece of program, the code set or the instruction set is loaded and executed by the processor to implement the method for managing a sidelink bearer executed by a sending terminal provided by the above method embodiments.

Those of ordinary skill in the art can understand that all or part of the steps of implementing the above embodiments may be completed by hardware, or may be completed by instructing relevant hardware through a program, and the program may be stored in a computer-readable storage medium. The storage medium mentioned above may be a read-only memory, a magnetic disk or an optical disk, etc.

The above is only an optional embodiment of the present application and is not intended to limit the present application. Any modification, equivalent replacement, improvement, etc. made within the spirit and principles of the present application shall be included in the protection scope of the present application.

What is claimed is:

1. A method for managing a sidelink bearer, the method comprising:

acquiring, by a first terminal, a bearer status of the sidelink bearer, wherein the bearer status comprises: at least one of a first bearer status or a second bearer status, the first bearer status is a bearer status in the first terminal, and the second bearer status is a bearer status in a second terminal; and managing the sidelink bearer according to the bearer status, wherein the managing the sidelink bearer according to the bearer status comprises at least one of the following steps:

establishing the sidelink bearer according to the bearer status; or releasing the sidelink bearer according to the bearer status, wherein the first bearer status comprises a related state of a first Quality of Service (QoS) flow carried by the first terminal, wherein the related state of the first QoS flow comprises whether the first QoS flow exists in the first terminal;

wherein the second bearer status comprises a related state of a second QoS flow carried by the second terminal, wherein the related state of the second QoS flow comprises whether the second QoS flow exists in the second terminal;

wherein the managing the sidelink bearer according to the bearer status comprises:

in response to that the first terminal is in a dormant state or an inactive state in which a communication connection does not exists between the first terminal and a network device, managing the sidelink bearer according to the bearer status;

wherein in response to that the first terminal is in the dormant state or the inactive state, managing the sidelink bearer according to the bearer status comprises:

in response to that the first terminal is in the dormant state or the inactive state and that the sidelink bearer is not established, establishing the sidelink bearer.

2. The method according to claim 1, wherein the managing the sidelink bearer according to the bearer status comprises:

in response to that the first terminal is in a connected state in which a communication connection exists between the first terminal and a network device, determining to send bearer information to the network device according to the bearer status.

3. The method according to claim 1, wherein a condition for triggering establishment of the sidelink bearer comprises:

the first terminal has not yet established the sidelink bearer.

4. The method according to claim 1, wherein in response to that the first terminal is in the dormant state or the inactive state, managing the sidelink bearer according to the bearer status further comprises:

in response to that the first terminal is in the dormant state or the inactive state, and that the first QoS flow is not carried in the sidelink bear and/or the second bearer status indicates that the second QoS flow is not carried in the second terminal, releasing the sidelink bearer according to the bearer status.

5. The method according to claim 1, wherein the acquiring the bearer status of the sidelink bearer comprises:

acquiring the second bearer status through a PC5 connection established between the first terminal and the second terminal.

6. A terminal, comprising:

a processor;

a transceiver connected to the processor; and a memory for storing executable instructions for the processor;

wherein the processor is configured to load and execute the executable instructions to implement:

acquiring a bearer status of a sidelink bearer, wherein the bearer status comprises: at least one of a first bearer status or a second bearer status, the first bearer status is a bearer status in the first terminal, and the second bearer status is a bearer status in a second terminal; and managing the sidelink bearer according to the bearer status, wherein the processor is further configured to implement at least one of the following:

establishing the sidelink bearer according to the bearer status; or releasing the sidelink bearer according to the bearer status, wherein the first bearer status comprises a related state of a first Quality of Service (QoS) flow carried by the first terminal, wherein the related state of the first QoS flow comprises whether the first QoS flow exists in the first terminal;

wherein the second bearer status comprises a related state of a second QoS flow carried by the second terminal, wherein the related state of the second QoS flow comprises whether the second QoS flow exists in the second terminal;

wherein the processor is further configured to, in response to that the first terminal is in a dormant state or an inactive state in which a communication connection does not exists between the first terminal and a network device, manage the sidelink bearer according to the bearer status;

wherein the processor is further configured to, in response to that the first terminal is in the dormant state or the inactive state and that the sidelink bearer is not established, establish the sidelink bearer.

7. The terminal according to claim 6, wherein the processor is further configured to:

in response to that the first terminal is in a connected state in which a communication connection exists between the first terminal and a network device, determine to send bearer information to the network device according to the bearer status.

* * * * *